United States Patent Office 3,335,294
Patented Aug. 8, 1967

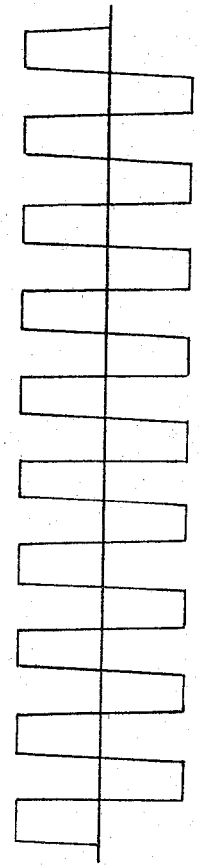
FIG.2a
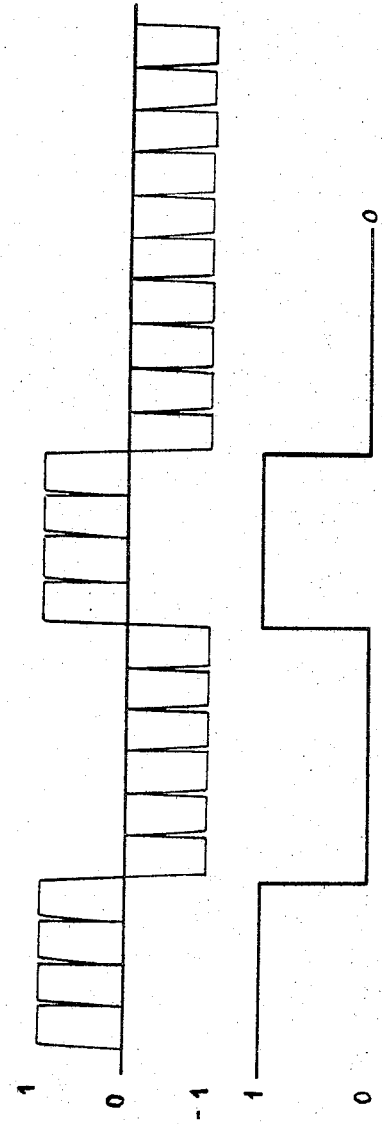
FIG.2b
FIG.2c

3,335,294
CIRCUIT FOR THE CONTROL AND NEGATIVE POLARISATION OF CONTROLLED RECTIFIERS
Robert Chauprade, Puteaux, France, assignor to Le Matériel Electrique S.W., Paris, France, a company of France
Filed Jan. 28, 1965, Ser. No. 428,810
Claims priority, application France, Jan. 28, 1964, 961,768
1 Claim. (Cl. 307—88.5)

ABSTRACT OF THE DISCLOSURE

A circuit for the control and negative polarisation of controlled rectifiers includes a high frequency source; a logical polarisation control; and an OSC fire order control. The high frequency pulses are blocked by two transistors which pass the pulses only when they are opened by the fire order control which in turn can control the two transistors only when a third transistor is opened by a signal from the logical polarisation control.

---

The present invention has for its subject a circuit for the control and negative polarisation of controlled rectifiers in which the functions of firing order and firing power are separated.

In controlled rectifier circuits such as, for example, those used in static contactors or in power amplifiers fed from a source of 50 cycles–60 cycles, monophase or polyphase, the control pulses are characterised by the fact that the position of the pulse can be regulated with respect to a voltage or reference voltage, this latter having a fixed phase relation to the anode voltage of the controlled rectifier the phase angle of which one wants to regulate.

The operation of the controlled rectifier is known, the conditions necessary at its firing are that the anode is positive with respect to the cathode on firing and during the conduction period the load circuit must be such that the anode-cathode current is greater than the excitation current and than the maintaining current; for initiating conduction, the grid has to receive a pulse positive with respect to the cathode.

The duration, amplitude and power of the control pulse are important parameters, the actual control circuits respond generally to the firing conditions of the controlled rectifiers.

The evolution of applications of controlled silicon rectifiers is such that new requirements appear.

The number of elements assembled in "series parallel" groups of controlled rectifiers constituting power amplifiers having increased, the problem of the multiplication of pulses generated by one and the same circuit is posed, and this without losing sight of the electric insulating necessary between the different grid circuits.

These groups of controlled rectifiers consist of elements connected in series and in parallel in the same bridge circuit.

As far as those in parallel are concerned, the balance of the currents is assured by mutual induction.

As far as those in series are concerned, it must be remembered that it is necessary, if one wants an equal division of voltages across the controlled rectifiers, that these fire at the same instant or, if the firing device generates pulses, the growth time of which is considerably greater than a microsecond, that is to say greater than the time necessary for the rectifier to pass from the non-conducting state to the conducting state, it is necessary to connect a special device across each controlled rectifier.

Besides, constructors and users are becoming more and more interested in polarising the grid of controlled rectifiers negatively, at precise instants or quite simply during the time when the rectifier has to be rendered non-conductive. This negative polarisation prevents self-firing of controlled rectifiers and allows them to accept higher voltage slopes without self-firing. Further it happens that a controlled rectifier can become conductive by man-made static providing the energy required for firing this rectifier, there again negative polarisation provides an increase in the stability of controlled rectifiers.

Up till then, these disadvantages have been more or less well taken care of by inserting a capacitor in parallel between grid and cathode, the value of which could reach many microfarads.

The object of the present invention is a circuit supplied with negative polarisation and maintaining it for the desired time by locking the controlled rectifier whilst causing its control electrode to be effected by a circuit comprising on the one hand, a first transistor (the collector of which is connected to a power oscillator circuit through a first rectifier and the emitter of which is connected to the control electrode of the controlled rectifier, and on the other hand a second transistor of opposite type to the first, the collector of which is connected to the power oscillator circuit through a second rectifier and the emitter of which is connected to the control electrode of the controlled rectifier, the base of the two first transistors being connected to the emitter of a third transistor of the same type as the first transistor, the collector of which is connected to a firing circuit and the base of which is connected to the secondary of a transformer the primary of which is connected to a logical circuit giving the blocking order, the base of the second transistor being also connected, by means of a resistance, to the rectifier corresponding to it).

The invention will now be described with reference to an embodiment shown in the figures.

FIGURE 2a represents the alternative signal of rectangular shape at the output of the oscillator.

FIGURE 2b represents the signal obtained at the output of the device according to the invention and exciting the control electrode of a controlled rectifier.

FIGURE 2c represents the logical signal controlling polarisation.

Figure 1:
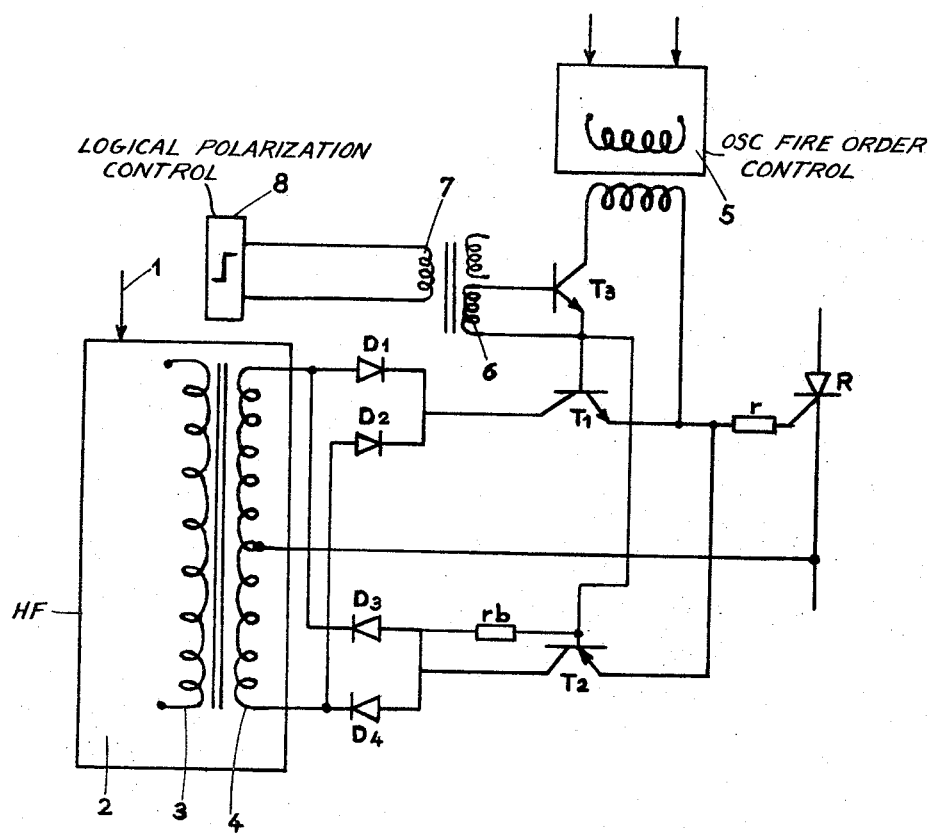
FIGURE 1 is a diagram showing a practical example of the invention.

The energy required to control $n$ controlled rectifiers R is drawn from a direct current source 1. The direct current is converted into alternating current of rectangular wave form by a high frequency oscillator 2, the output of which is connected to the primary 3 of a transformer, the secondary of which consists of N windings identical to that 4 shown in FIGURE 1. The ends of the secondary 4 of the transformer are connected on the one hand, to rectifying diodes $D_1$ and $D_2$, and on the other hand, to the diodes of rectifiers $D_3$ and $D_4$. The positive rectified signal obtained at the output of the diodes $D_1$ and $D_2$ is applied to the collector of a transistor $T_1$ of the NPN type for example, the emitter of which is connected to the control electrode of the controlled rectifier R, through a grid resistance $r$.

The negative rectified signal obtained at the output of the diodes $D_3$ and $D_4$ is applied to the collector of the transistor $T_2$ of opposite type to that of $T_1$, the emitter of which is connected to the control electrode of the controlled rectifier R and the base of which is connected through a resistance $rb$ to the output of diodes $D_3$ and $D_4$.

The bases of the transistors $T_1$ and $T_2$ are connected to the emitter of a transistor $T_3$ of the same type as $T_1$, the collector of which is connected to the output of a firing circuit 5 of known type. The base of the transistor 3 is connected to a secondary 6 of a transformer having a large number of secondaries, the primary of which is connected to a logical circuit 8.

The cathode of the controlled rectifier R is connected to the center tapping of the secondary 4 of the transformer.

The information provided by the logical circuit 8 acts on the transistor $T_3$ and interferes with the order coming from the firing circuit 5, locking the controlled rectifier R by suppression of the positive pulse and maintains a negative polarisation.

Whenever, the logical circuit 8 does not send non-conduction information, the pulse occurring across the secondary 6, saturates the transistor $T_3$ which transmits the orders from the firing circuit. When no firing order is emitted, that is to say if no voltage is applied between bases and emitters of the transistors $T_1$ and $T_2$, the transistor $T_1$ is non-conductive; a current circulates between the center tapping of the secondary 4, the cathode of the controlled rectifier R, the resistance $r$, the emitter of the transistor $T_2$ and the resistance $rb$; the transmitter $T_2$ conducts and polarises the controlled rectifier R negatively. This state of negative polarisation of the controlled rectifier R can be maintained by blocking order from the logical circuit and acting on the transistor $T_3$ which stops the orders from the firing circuit 5. When a firing order is emitted, that is to say, a positive voltage is applied between bases and emitters of the transistors $T_1$ and $T_2$, the transistor $T_2$ becomes non-conductive, the transistor $T_1$ conducts and polarises the controlled rectifier R, positively.

FIGURE 2a shows the direct current signal 1 which feeds the oscillator 2, at the output of the latter.

This signal is of rectangular form, practically without a growth time, the insulation is assured by the transformer 3, 4.

FIGURE 2b shows the control pulses transmitted to the controlled rectifier R.

FIGURE 2c shows the logical signal controlling the polarisation.

The presence of logical delay circuits 8 is justified by the delay required between the instant when the time-base orders from one group of controlled rectifiers to the other is sent, and the moment when the one thereafter starts the second group of controlled rectifiers.

In order to convey the signal leaving the logical modulators 8 (delay circuit) to the switch $T_3$ connected in series in the output circuit of the firer 5, it is necessary to isolate it. To this end, the output signal of the logical circuit is decoupled with the aid of a transistor driven from an auxiliary winding taken from the oscillator 2.

It is understood that the invention is not limited to the details of the embodiment just described, these could be modified without departing from the scope of the invention.

For example, the circuit is applicable to the case of a reversible control by induction of a direct current motor in which one wants to fire two groups of twenty-four controlled rectifiers, supply them wtih negative polarisation, lock the rectifiers by suppression of the positive pulse and maintain a negative polarisation.

What I claim is:

Circuit for the control and negative polarisation of a controlled rectifier in which the functions of firing order and firing power are separated, characterised by the fact that it comprises on the one hand, a first transistor, the collector which is connected to a power oscillator circuit through a first rectifier and the emitter of which is connected to the control electrode of the controlled rectifier, and on the other hand a second transistor of opposite type to the first, the collector of which is connected to the power oscillator circuit through a second rectifier and the emitter of which is connected to the control electrode of the controlled rectifier, the base of the two first transistors being connected to the emitter of a third transistor of the same type as the first transistor, the collector of which is connected to a firing circuit and the base of which is connected to the secondary of a transformer the primary of which is connected to a logical circuit giving the blocking order the base of the second transistor being also connected, by means of a resistance, to the rectifier corresponding to it.

References Cited

UNITED STATES PATENTS 3,153,187   10/1964   Klees _____ 307—88.5

ARTHUR GAUSS, *Primary Examiner.*

B. P. DAVIS, *Assistant Examiner.*